(12) United States Patent  
Rupp et al.

(10) Patent No.: US 6,927,508 B1  
(45) Date of Patent: Aug. 9, 2005

(54) DECOUPLING DEVICE FOR ACTUATORS

(75) Inventors: Bernhard Rupp, Sulzfeld (DE); Gerd Knoepfel, Buehl (DE); Otto Brass, Buehl (DE); Gerhard Zink, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 605 days.

(21) Appl. No.: 09/831,150

(22) PCT Filed: Sep. 5, 2000

(86) PCT No.: PCT/DE00/03045

§ 371 (c)(1),  
(2), (4) Date: Nov. 22, 2002

(87) PCT Pub. No.: WO01/18424

PCT Pub. Date: Mar. 15, 2001

(Under 37 CFR 1.47)

(30) Foreign Application Priority Data

Sep. 8, 1999 (DE) .......................................... 199 42 840

(51) Int. Cl.⁷ ................................................ H02K 5/24
(52) U.S. Cl. ............................ 310/51; 310/89; 310/91; 248/608; 248/609
(58) Field of Search ............................ 310/51, 89, 91; 248/608, 609

(56) References Cited

U.S. PATENT DOCUMENTS 2,881,995 A * 4/1959 Neher ........................ 248/604
3,746,894 A * 7/1973 Dochterman et al. ......... 310/51
5,530,304 A * 6/1996 Mirumachi et al. ........... 310/51
6,278,209 B1 * 8/2001 Rupp et al. .................... 310/91

FOREIGN PATENT DOCUMENTS

| DE | 605203 | * 10/1932 | |
| DE | 3641096 A1 | * 7/1987 | ............ H02K/5/10 |
| DE | 4306588 A1 | * 1/1994 | ............ H02K/5/24 |
| DE | 43 21 633 A | * 1/1995 | ............ F16F/15/12 |
| DE | 04321633 A | * 12/1995 | ............ H02K/5/24 |
| EP | 736954 A1 | * 10/1996 | ............ H02K/5/24 |
| FR | 1255721 | * 4/1960 | |
| FR | 1 255 721 A | * 6/1961 | |
| FR | 2732524 A | * 3/1995 | ............ H02K/5/24 |
| FR | 2 732 524 A | * 10/1996 | ............ H02K/5/24 |

* cited by examiner

Primary Examiner—Darren Schuberg  
Assistant Examiner—J. Aguirrechea  
(74) Attorney, Agent, or Firm—Ronald E. Greigg

(57) ABSTRACT

The invention relates to the decoupling device for an actuator, which has a number of decoupling elements. A securing element is disposed between these decoupling elements. The actuator is fastened to the securing element. The decoupling elements rest against radial support shoulders and axial support shoulders of the securing element and a housing. These are embodied so that radial, axial, and tangential oscillations of the actuator are decoupled from the housing.

23 Claims, 8 Drawing Sheets

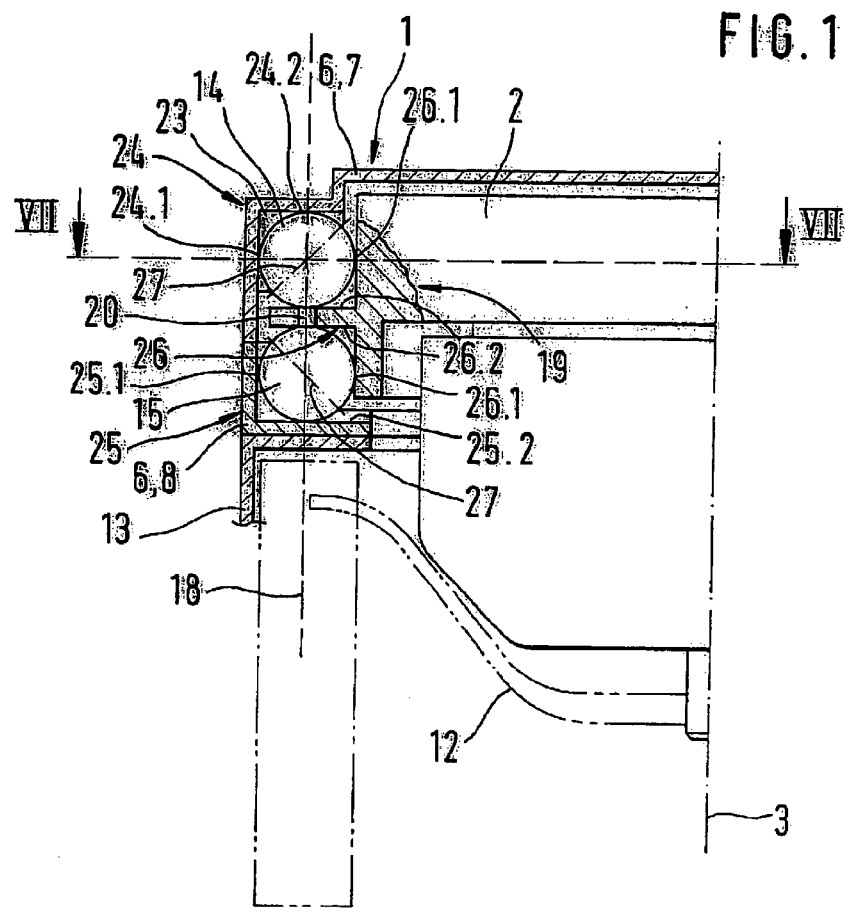
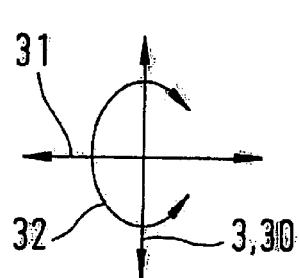
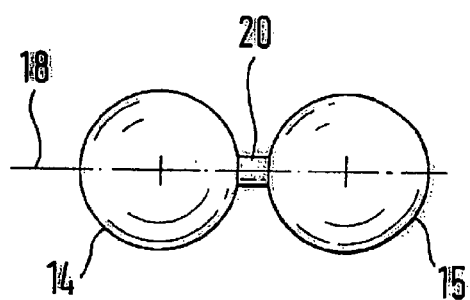
FIG.1
FIG.2
FIG.3

FIG.5
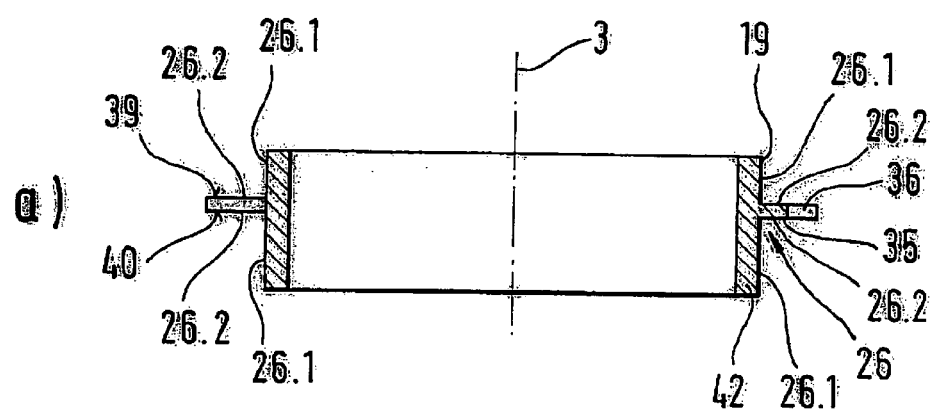
a)
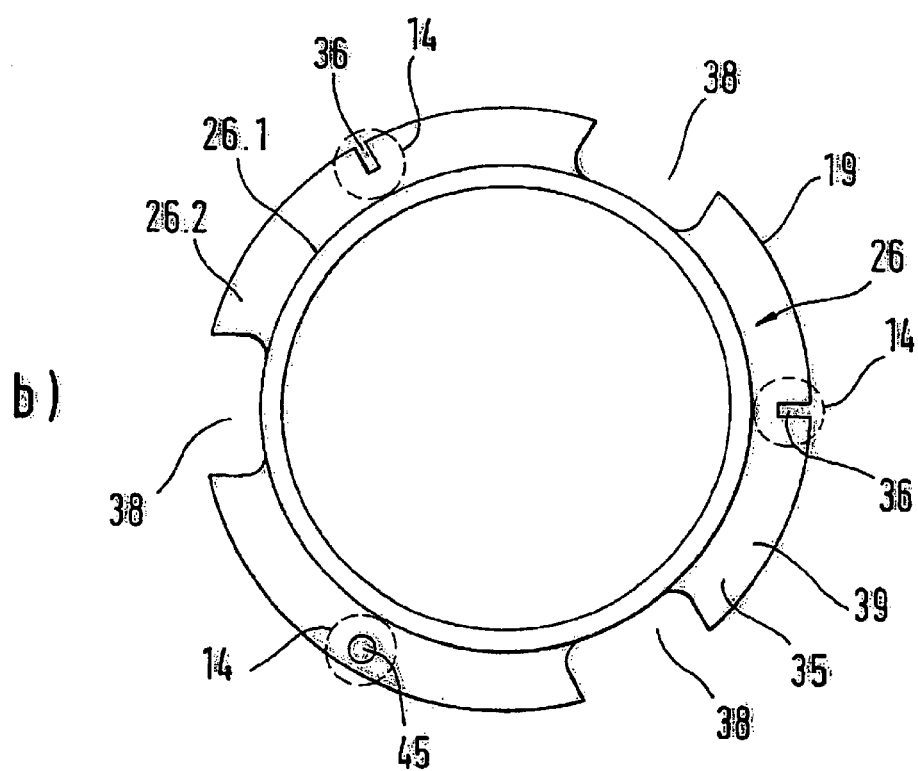
b)

FIG. 6
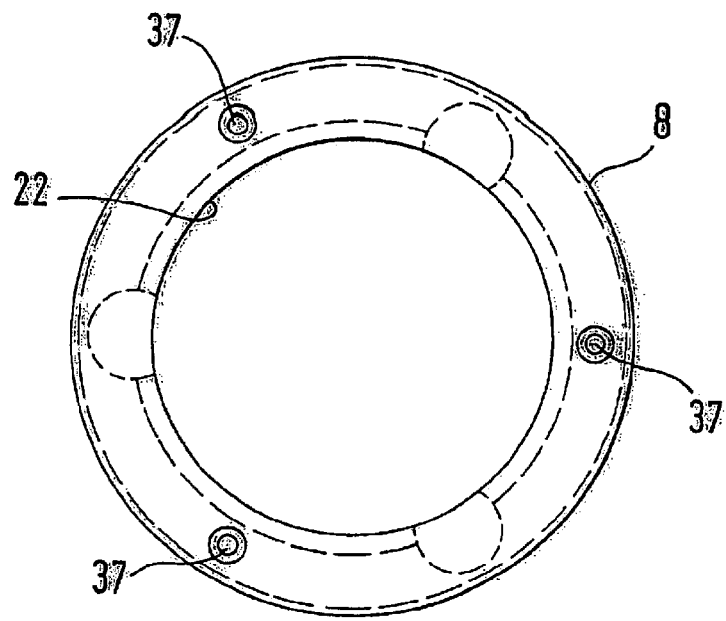
a)
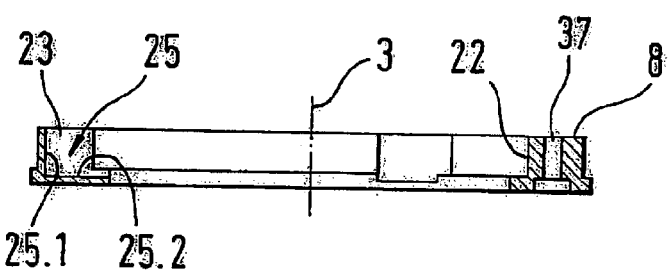
b)
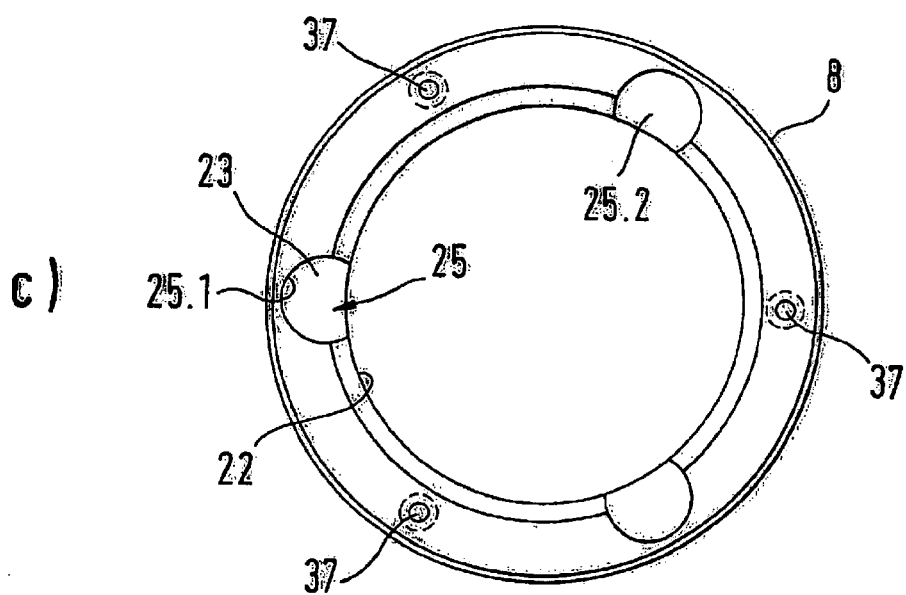
c)

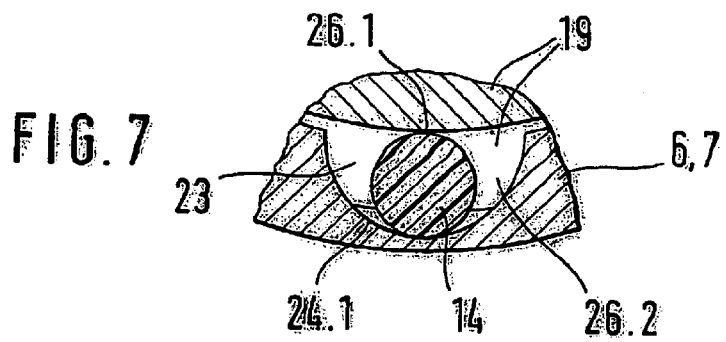
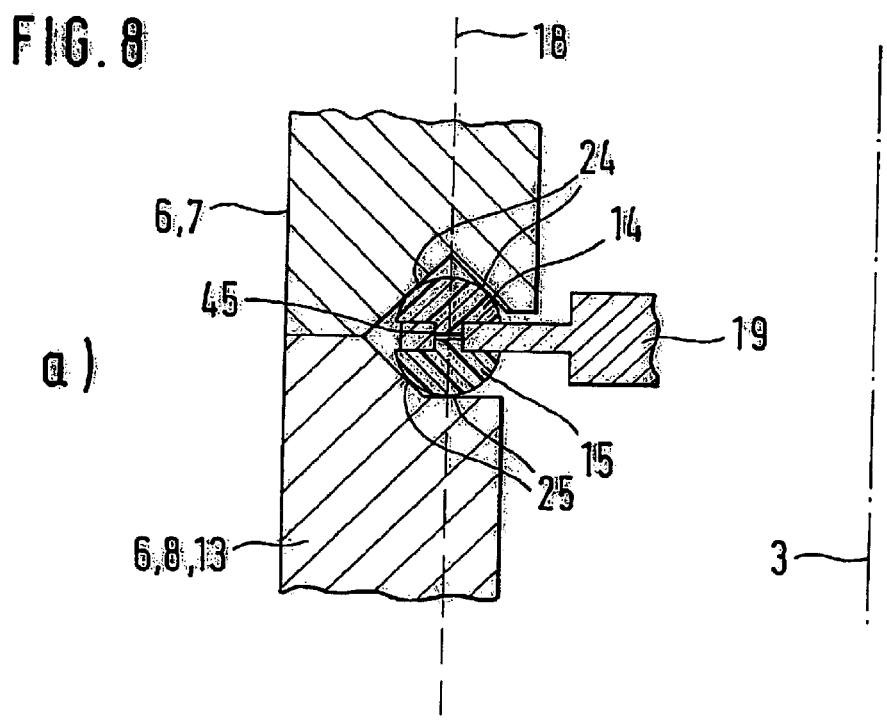

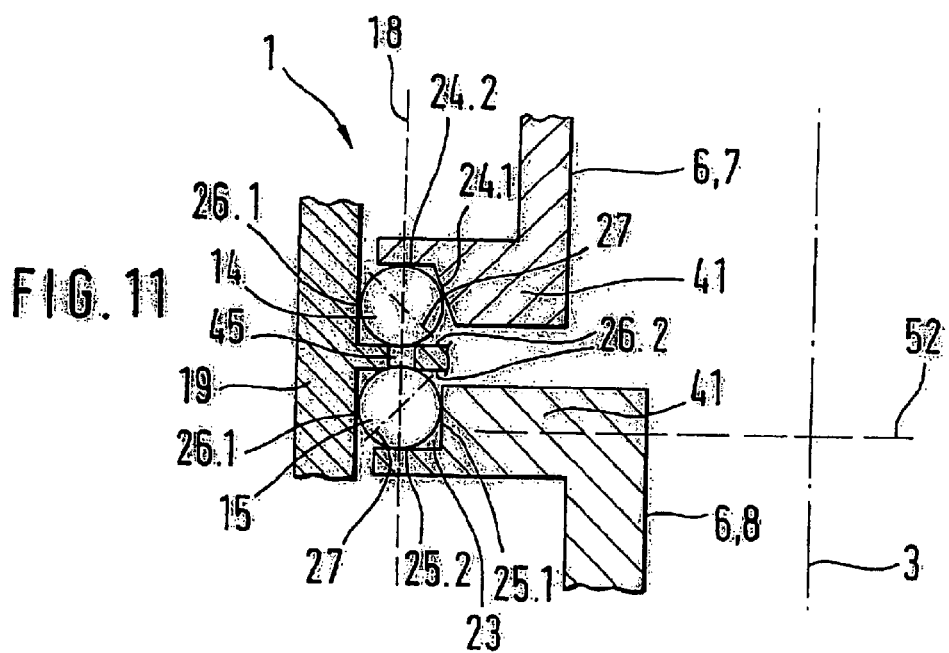
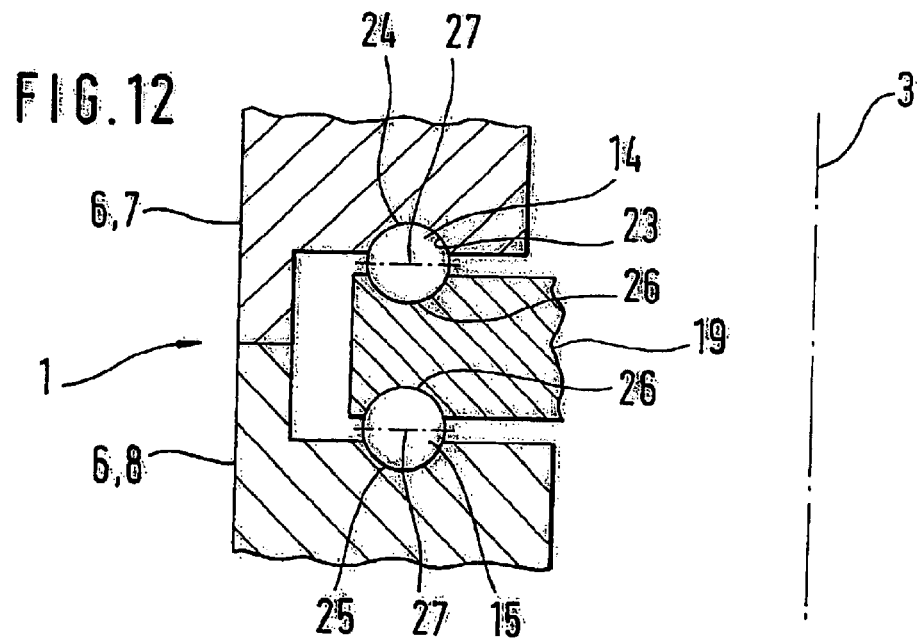

US 6,927,508 B1

DECOUPLING DEVICE FOR ACTUATORS

CROSS-REFERENCE TO RELATED APPLICATIONS

This application is a 35 USC 371 application of PCT/DE 00/03045 filed on Sep. 5, 2000.

BACKGROUND OF THE INVENTION

1. Field of the Invention

The invention is directed on a decoupling device for actuators.

2. Description of the Prior Art

During operation of the actuator—in particular an electric motor which, by means of decoupling elements, is connected to a function housing via a decoupling housing—tangential rotary oscillations are produced, for example in a main excitation oscillation direction of the actuator, and oscillations are produced in the radial and axial directions. For a decoupling between the actuator and the decoupling housing, this means that they must be particularly soft in the tangential direction and must be significantly more rigid in the axial direction and radial direction.

Decoupling devices for actuators and electric motors are known, but these are relatively rigid. Running noise of the electric motor and running-induced oscillations of a fan connected for example to the electric motor, e.g. due to an imbalance of the impeller, are largely transmitted to a fan housing and lead to an undesirable generation of noise.

With elastic decoupling elements which on the one hand are intended to hold the actuator or the electric motor in support regions and on the other hand are intended to achieve a damping, these conflicting demands result in the fact that the decouplings are placed under initial stress. Since the damping of oscillations takes place through flexing work in the decoupling elements, an optimal decoupling is not possible.

In addition, the decoupling elements are adjusted in terms of their natural frequency so that a natural frequency of the decoupling element differs significantly from a natural frequency of the actuator. The damping can as a result be partially increased.

EP 0 682 396 A2 has disclosed the use of elastic balls, preferably comprised of an elastomer, in order to decouple two components from each other. The balls are each accommodated in an ellipsoidal cavity so that the balls permit a certain amount of free rotational movement. Each component has cavities of this kind so that the cavities of the two components are disposed opposite each other after assembly. The cavities are let into an intermediary piece.

However, the device requires a central securing element and for damping, requires another elastic element which is disposed around a longitudinal axis.

SUMMARY OF THE INVENTION

The decoupling device according to the invention has the advantage over the prior art that an almost ideal decoupling of all oscillations of the actuator is achieved in a simple manner.

The configuration of decoupling elements is advantageously embodied in the form of an "angular ball bearing", since as a result, powerful forces can be absorbed and oscillations in the tangential direction can be damped. Oscillations in the radial and axial directions are damped through elastic compression of the balls. The decoupling elements are simply subjected to pressure in all of the loading directions of the system. This results in a favorable ability to withstand vibration.

Particularly advantageous decoupling elements are rolling bodies in the form of balls made of an elastomer, which are connected to one another by means of an intermediary piece that is inserted into a slot of a securing element. This allows the decoupling elements to be very easily held and installed.

It is also advantageous to embody recesses that constitute the support shoulders for the decoupling elements in the shape of arcs.

It is also advantageous to distribute the decoupling elements uniformly in the

BRIEF DESCRIPTION OF THE DRAWINGS

Exemplary embodiments of the invention are described herein below and are shown in a simplified fashion in the drawings, in which:

FIG. 1 shows a section through an actuator with a decoupling device,

FIG. 2 is a schematic depiction of existing stress directions,

FIG. 3 shows an exemplary embodiment of decoupling elements,

FIGS. 5a & b show a securing element,

FIGS. 6a–c show a second part of a decoupling housing,

FIG. 7 shows a section along the line VII—VII in FIG. 1,

FIGS. 8a–c show another exemplary embodiment of a decoupling device and a decoupling element, FIG. 10 shows another exemplary embodiment for a securing element and a FIG. 11 shows another possible disposition of the securing element and FIG. 12 shows another possible embodiment of support shoulders in a decoupling housing and a securing element.

DESCRIPTION OF THE PREFERRED EMBODIMENTS

Figure 4:
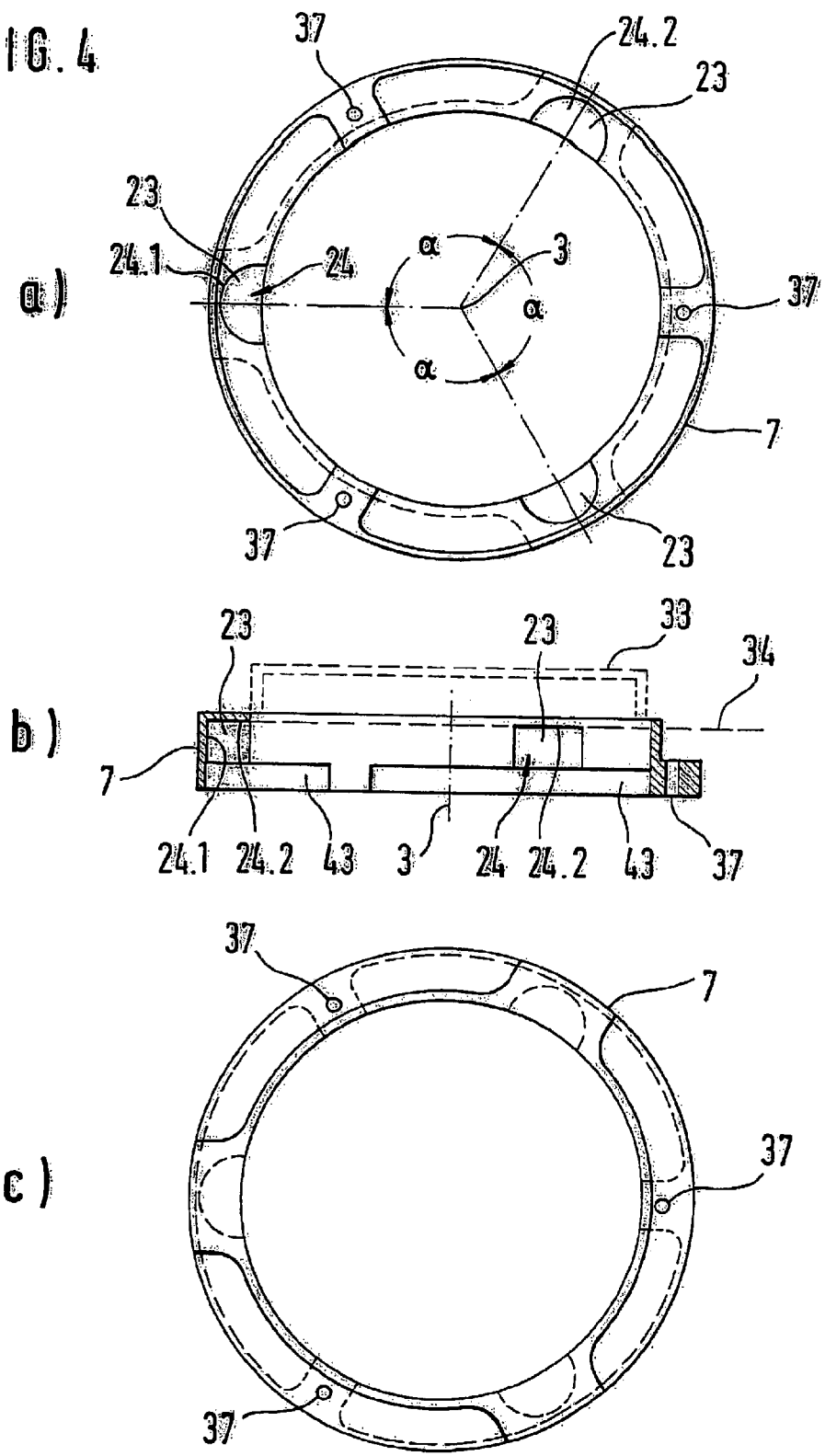
FIGS. 4a–c show a first part of a decoupling housing.

FIG. 1 shows a section through a decoupling device 1 with an actuator 2. This combination of the decoupling device 1 and actuator 2, for example an electric motor 2, has a longitudinal axis 3. The decoupling device 1 is comprised of a decoupling housing 6, which is composed, for example, of two annular parts, an upper part 7, and a base part 8. The decoupling housing 6 is adjoined by a function housing 13, for example a fan housing 13, which encompasses a fan 12 driven by the electric motor. The base part 8 of the decoupling housing 6 can, for example, also be part of the function housing 13. The decoupling housing 6 is then comprised of the housing parts 7 and 13.

The decoupling device 1 is also composed of elastic decoupling elements 14, 15 and a securing element 19, e.g. in the form of a ring in this instance. The decoupling elements 14, 15 here are for example rolling bodies which in this instance are embodied in the shape of balls and are made, for example, of an elastomer.

The decoupling elements 14, 15 in this instance are disposed one above the other in pairs, for example, along a line 18 which extends parallel to the longitudinal axis 3. The actuator 2 is connected at least indirectly to the securing element 19.

The decoupling elements 14, 15 are connected to each other, for example, by means of an intermediary piece 20. A longitudinal axis of the intermediary piece 20 extending parallel to the line 18 runs parallel to the longitudinal axis 3 when the decoupling device 1 is installed. The presence of the intermediary piece or strut 20 permits the two decoupling elements 14, 15 to be very easily held simultaneously and permits them to be installed as an ensemble with the securing element 19.

In both decoupling housing halves 7, 8, there are recesses 23 that open toward the longitudinal axis 3 and are disposed in the outer radial edge region, which constitute support shoulders 24, 25 in the top part 7 or bottom part 8 of the decoupling housing for the decoupling elements 14, 15. The securing element 19 disposed inside the decoupling housing 6, 7, 8 provides support shoulders 26 disposed opposite from the support shoulders 24, 25.

The support shoulders 24–26 have sections which are disposed in the radial direction and are referred to as radial support shoulders 24.2, 25.2, 26.2. These are engaged by axial forces. The support shoulders 24–26 also have sections which are disposed in the axial direction and are referred to as axial support shoulders 24.1, 25.1, 26.1. These are acted on by radial forces. Axial support shoulders 24.1, 25.1, 26.1 and radial support shoulders 24.2, 25.2, 26.2 are disposed for example perpendicular to each other here.

The support shoulder 24.1 is referred to as the axial support shoulder because it extends approximately parallel to the longitudinal axis 3. The support shoulder 24.2 is referred to as the radial support shoulder because in this instance, it extends approximately perpendicular to the longitudinal axis 3.

Because the decoupling elements 14, 15 are secured in the recesses 23 (FIG. 7) and are connected to each other by means of the intermediary piece 20, it is not possible for the securing element 19 to rotate entirely around the longitudinal axis 3.

The support shoulders 24–26 are embodied so that when there is a relative rotation of the securing element 19 in relation to the decoupling housing 6, 7, 8 the decoupling elements 14, 15 roll around a rotational axis 27 that extends obliquely in relation to the longitudinal axis 3. In principle, this corresponds to the disposition of a dual-row angular ball bearing. In order to absorb axial forces in both directions, the decoupling elements 14, 15 are disposed in opposition. Ball bearing terminology refers to X configurations and O configurations.

FIG. 2 shows the oscillation directions in the axial 30, radial 31, and tangential 32 direction, which occur during operation of the actuator 2. The decoupling device 1 should decouple these oscillations of the actuator 2 from the fan housing 13, for example.

FIG. 3 shows how two decoupling elements 14, 15, which are round in cross section for example, are connected to each other by means of the intermediary piece 20, for example. The cross section of the intermediary piece 20 perpendicular to the line 18 can be rectangular or also round, for example.

FIG. 4 shows the top part 7 of the decoupling housing 6 from FIG. 1 in a bottom view and top view (FIGS. 4a, c) and shows a cross section in FIG. 4b.

For example, the top part 7 has a round, annular cross-sectional contour. Any other cross-sectional contour is also conceivable, for example a quadriform cross-sectional contour.

The top part 7 can also be embodied as cup-shaped 33, as indicated with dashed lines in FIG. 4b. In this instance, the top part 7 contains for example three recesses 23, which constitute the support shoulders 24.1, 24.2 for the decoupling elements 14. In FIG. 4a, center lines are shown extending from the recesses 23, perpendicular to the longitudinal axis 3 that extends perpendicular to the plane of the drawing. The drawing clearly shows that recesses 23 adjacent to one another in the circumference direction and decoupling elements 14 disposed in the recesses 23 are disposed at a uniform angle α from one another. In FIG. 7, a section VII—VII in FIG. 1 is shown, which shows the recess 23 more clearly.

After assembly, the decoupling elements 14, 15 rest against the support shoulders 24.1, 24.2, 25.1, 25.2.

FIG. 4b shows a plane 34 which extends perpendicular to the longitudinal axis 3 and passes through the radial support shoulder 24.2. The recesses 23 and therefore the decoupling elements 14 are thus disposed, for example, in one plane.

In an outer region of the top part 7, there is a bore 37 through which for example a screw is guided, in order to connect the top part 7 to the base part 8 and housing 13.

In the vicinity of the recesses 23, oblong indentations 43 that open toward the securing element 19 are engaged by the radial projections 35 (FIG. 5) of the securing element 19.

The top part 7 of the decoupling housing 1 is made of plastic, metal, or ceramic.

FIG. 5 shows the securing element 19, which is embodied as annular, for example. The securing element 19 in this instance is adapted, for example, to the cross-sectional contour of the top part 7 of the decoupling housing 6 from FIG. 4. Any other cross-sectional contour is also conceivable.

The securing element 19 has at least one radial projection 35. The radial projection 35 is disposed, for example, on the outer edge of the securing element 19. This radial projection 35 can extend, for example, around the entire securing element 19. However, as shown in FIG. 5b, this radial projection can also be provided only where the decoupling elements 14, 15 are disposed after assembly, which positions are indicated here with dashed lines, in order to separate the decoupling elements 14 from the decoupling elements 15 at these locations.

If, in order to reduce the number of components, the decoupling elements 14, 15 are connected to each other by means of the intermediary piece 20, for example, then the securing element 19 is provided with a slot 36 in the projection 35, into which the intermediary piece 20 is inserted. This facilitates assembly. The slot depth in the projection 35 must be at least deep enough that the decoupling elements 14, 15 connected by the intermediary piece 20 can be inserted until they touch the support shoulders 26 of the securing element 19.

If the decoupling elements 14, 15 are installed individually, without being connected to one another by an intermediary piece 20, then instead of the slot, a recess 45 or an axial hole 45 can be provided, in which the decoupling element 14, 15 is partially disposed so that is not possible to rotate the securing element 19 entirely around the longitudinal axis 3.

The recesses 45, for example holes 45, in the securing element 19 are produced, for example, so that after assembly of the decoupling housing 6 and securing element 19, these holes are disposed centrally between the decoupling elements 14, 15. The decoupling elements 14, shown with dashed lines here, are then disposed in the holes 45.

A diameter of the holes 45 should not be so large that the axially opposed decoupling elements 14, 15 touch after assembly. The diameter of the holes 45 thereby depends on the thickness of the securing element 19 at the location of the hole 45.

Depending on the number of decoupling elements 14, 15, the securing element 19 has the same number of recesses 45 or slots 36. For example, the securing element 19 can be provided with only slots 36 or only recesses 45. Any combination of slot 36 and recess 45 in the projection 35 is also conceivable.

The securing element 19 has radial and axial support shoulders 26.1, 26.2 for the decoupling elements 14, 15; a radial support shoulder 26.1 is embodied on a front side 39 and a back side 40 of each radial projection 35 and an axial support shoulder 26.2 is embodied on the annular body 42 perpendicular to the radial support shoulder 26.1 and divided by the projection 35.

A notch 38 is disposed on the securing element 19 in those locations where a screw, for example, which connects the housing parts 7, 8, 13 to one another, passes through after assembly.

The securing element 19 is made of plastic, metal, or ceramic.

FIG. 6 shows the base part 8 of the decoupling housing 6 in a bottom view and top view (FIGS. 6a, c) and shows a cross section in FIG. 6b.

For example, the base part 8 has an annular cross-sectional contour. In this instance, this base part 8 contains for example three recesses 23 which constitute the support shoulders 25 for the decoupling elements 1s and, toward the securing element 19, open toward an inner edge 22 of the base part 8.

The recesses 23 and therefore the decoupling elements 15 are disposed, for example, in one plane.

In an outer region of the base part 8, there is at least one bore 37. For example, a screw is guided through this bore 37 of the part 8 and through another bore of the part 7 in order to connect the base part 8 to the top part 7. The recesses 23 of the part 8 are then disposed over the recesses 23 of the part 7.

The base part 8 of the decoupling housing 6 is made of plastic, metal, or ceramic.

During assembly, the parts 6, 7, 19, and 6, 8, or 13 are assembled so that the respective recesses 23 and the slots 36 are disposed congruently over one another. As a result, other centering elements are not required.

FIG. 7 shows a section along the line VII—VII in FIG. 1. The support shoulder 24 is constituted by the recess 23 and is embodied approximately in the form of a semicircle, in this instance arc-shaped, in such a way that when torque is delivered by the electric motor 2, as an example of an actuator, and with the accompanying rolling motion, the decoupling elements 14 embodied as balls are elastically compressed and a restoring force is generated by the elastic deformation. The embodiment as an arc-shaped recess 23 produces a progression of restoring force since the deformation of the decoupling elements 14, 15 increases progressively. The elastic deformation of the intermediary piece 20 in this movement plays a subordinate role here. The curvature of the arc-shaped recess 23 is for example less than the curvature of the decoupling elements 14. The recess 23 can, for example, also be embodied as elliptical. In this connection, the sharpest curvature of this elliptical form can correspond at most to the curvature of the ball 14.

It is also conceivable for the decoupling elements 14, 15 and the recess 23 to be embodied elliptically. It is also conceivable for there to be other combinations, with the embodiment of the decoupling elements 14, 15 in the form of rolling bodies in the recess 23. The recess 23 is embodied in the radial direction in such a way that the securing element 19 and the housing 6, 7 cannot touch after the decoupling element 14 is installed, i.e. there is a sufficiently large gap between the housing 6, 7 and the support shoulder 26.1.

These explanations for FIG. 7 apply analogously to a parallel slot through the recess 23 of the part 8 in FIG. 1.

FIGS. 8a–c show another exemplary embodiment of a decoupling device 1 and of decoupling elements 14, 15. The decoupling elements 14, 15 are embodied, for example, as hemispherical.

FIG. 8b shows a top view of a decoupling element 15 according to FIG. 8a, without the housing 6, 7, 8, 13 and the securing element 19. For example, the decoupling element 15 has a circular radial cross section in relation to the line 18 and is provided with a nipple 46. For example, the nipple has a round cross section.

FIG. 8c shows a side view of the decoupling element 15 according to FIG. 8b. The axial cross section of the decoupling element 15 in relation to the line 18 can also be elliptical for example.

The nipples 46 of the decoupling elements 14, 15 protrude, for example, into the existing hole 45 of the securing element 19 so that is not possible for the securing element 19 to rotate entirely around the longitudinal axis 3. A height of the nipples 46 of the decoupling elements 14, 15 is embodied so that at most, the two touch.

The decoupling elements 14, 15 can also be connected to each other, for example by virtue of the fact that the two nipples 46 constitute a common intermediary piece 20. These decoupling elements could then be inserted into the slot 36 of the securing element 19.

The securing element 19 in this exemplary embodiment of the decoupling device 1 does not have any support shoulders against which the decoupling elements 14, 15 roll.

Figure 9:
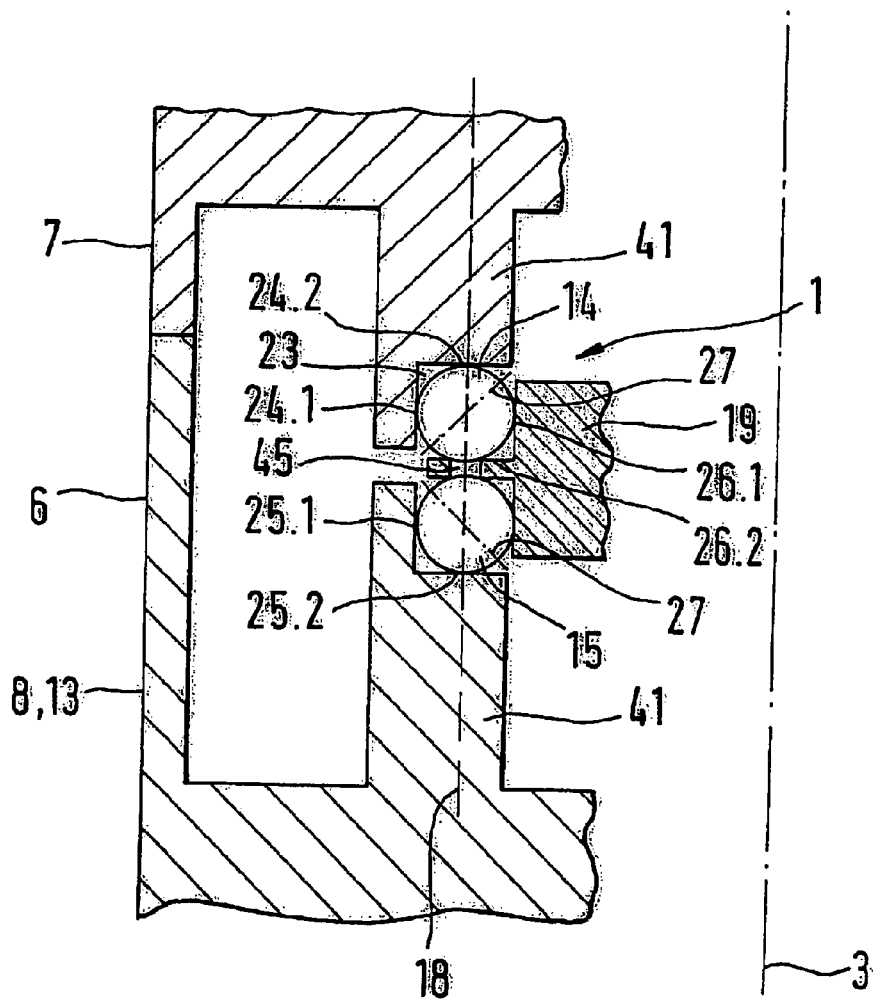
FIG. 9 shows another exemplary embodiment of a decoupling housing.

FIG. 9 shows another exemplary embodiment of the decoupling housing 6 or the function housing 13. Since the same reference numerals apply as in FIG. 1, no further explanation is given for them. For example, the decoupling elements 14, 15 are disposed one above the other in pairs along a line 18 that extends parallel to longitudinal axis 3. This embodiment differs from the one in FIG. 1 by virtue of the fact that the recesses 23 are not disposed on the edge of a part 7, 8, 13 of the decoupling housing 16, but are accommodated in a column 41. By way of example, FIG. 7 shows the cross section of the column 41 perpendicular to the longitudinal axis 3 through a support shoulder 24, 25. A longitudinal axis of the column 41 extending parallel to the line 18 in this instance extends, for example, parallel to longitudinal axis 3. The heights of the columns 41 in the decoupling housing parts 7 and 8 or 13 are selected so that after installation, the decoupling elements 14, 15 rest against the respective axial support shoulders 24.1, 25.1. The columns 41 of the two housing parts 7, 8, 13 can also touch. The columns 41 can also protrude beyond the housing parts 7, 8, 13 in the longitudinal direction. For example, the recesses in the outer housing part (FIG. 1) and the recesses in the columns (FIG. 9) can also be provided in an embodiment of the housing parts 6, 7, 8, 13.

It is not absolutely necessary that the decoupling elements 14, 15 be disposed above one another. Thus the decoupling housing parts 7 and 8 or 13 that have the recesses 23, as shown in FIGS. 1, 4, and 6, can be rotated around the longitudinal axis 3 by any arbitrary angle. It is then no longer possible for there to be a connection by means of an intermediary piece 20. Recesses 45 must then be provided, as shown in FIG. 5, at the corresponding locations in which the decoupling elements 14, 15 are disposed.

Figure 10:
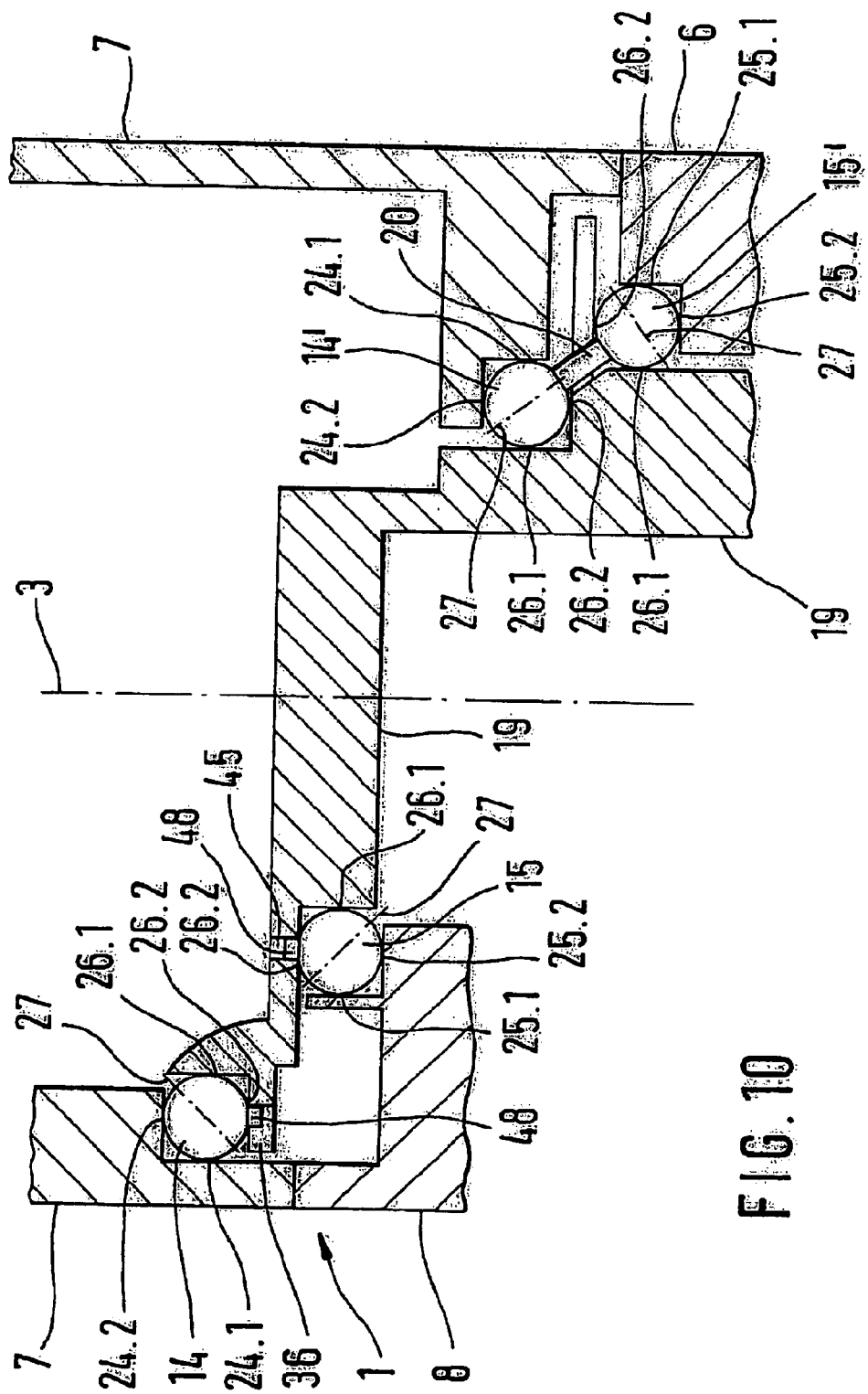

FIG. 10 shows another exemplary embodiment for the securing element 19 and a decoupling housing part 7, 8, 13. For example, the decoupling elements 14, 15 and 14', 15' are not disposed above one another. The decoupling elements 14, 14' or 15, 15' are not disposed in a plane extending perpendicular to the longitudinal axis 3. Decoupling elements 14', 15' that are connected to each other by means of the intermediary piece 20 (right half of FIG. 10) and other decoupling elements 14, 15 which are not connected to each other by means of an intermediary piece (left half of FIG. 10) can both be used in an embodiment of the decoupling device 1. The decoupling elements 14, 15 have a knob 48, which protrudes into a recess 45, a hole 45, or a slot 36. The decoupling elements 14', 15' are connected to each other by means of the intermediary piece 20, which does not extend parallel to longitudinal axis 3 after assembly of the decoupling device 1.

FIG. 11 shows another possible configuration of the securing element 19 and decoupling housing 6. Since the same reference numerals apply as in FIGS. 1 and 5, no further explanation is given for them here.

In this instance, the decoupling elements 14, 15 are disposed over one another in this instance, in pairs for example, along a line 18 which extends parallel to longitudinal axis 3. The recess 23 here is embodied in the column 41. In this instance, a longitudinal axis 52 of the column 41 extends perpendicular to longitudinal axis 3, for example. The longitudinal axis 52 of the column 41 can also be embodied at a different angle to the longitudinal axis 3.

In this instance, the securing element 19 constitutes the axial support shoulder 26.1 the farthest from the longitudinal axis 3. For example, a surface of the radial support shoulder 24.1 is not parallel to the longitudinal axis 3.

FIG. 12 shows another possible embodiment of support shoulders 24–26 in the decoupling housing 6, 7, 8, 13 and securing element 19. The support shoulders 24–26 in this instance are embodied so that the rotational axis 27 extends perpendicular to the longitudinal axis.

The curvature radius of the recess 23 in this instance corresponds, for example, to the curvature radius of the decoupling elements 14, 15. As a result, a clear identification of the axial and radial support shoulder is not possible.

The decoupling housing part 7 can also accommodate for example four decoupling elements in a manner already described above and the other decoupling housing part 8, 13 can accommodate for example five decoupling elements in a manner already described above. Any other combination is conceivable depending on the magnitude of the load.

The foregoing relates to a preferred exemplary embodiment of the invention, it being understood that other variants and embodiments are thereof are possible within the spirit and scope of the invention, the latter being defined by the appended claims.

We claim:

1. In a decoupling device (1) for an actuator (2) with a one-part or multiple part decoupling housing (6, 7, 8), which is connected to a function housing (13) and at least partially encompasses the actuator (2), and with decoupling elements (14, 15) comprised of an elastic material, wherein each decoupling element (14, 15) rests against support shoulders (24, 25, 26), the improvement comprising a securing element (19) disposed to extend between and engage at least two sets of decoupling elements (14, 15) each consisting of a plurality of decoupling elements (14, 15), said actuator (2) engaging said securing element (19).

2. The decoupling device according to claim 1, further comprising at least two support shoulders (24, 25, 26) for a decoupling element (14, 15), said support shoulders being constituted by the decoupling housing (6, 7, 8) or the function housing (13).

3. The decoupling device according to claim 2, wherein the set of decoupling elements (14, 15) each comprises a pair of decoupling elements.

4. The decoupling device according to claim 3, wherein said securing element (19) has a radial projection (35) extending partially or entirely around it and wherein the securing element (19) has at least one slot (36) in its radial projection (35) in the vicinity of the decoupling elements (14, 15).

5. The decoupling device according to claim 3, wherein the securing element (I 9) has a radial projection (35) extending partially or entirely around it and wherein the securing element (19) has at least one recess (45) in its radial projection (35) in the vicinity of the decoupling elements (14, 15).

6. The decoupling device according to claim 2, wherein said securing element (19) has a radial projection (35) extending partially or entirely around it and wherein the securing element (19) has at least one slot (36) in its radial projection (35) in the vicinity of the decoupling elements (14, 15).

7. The decoupling device according to claim 6, wherein said decoupling elements (14, 15) of each set are connected to each other in pairs by an intermediary piece (20).

8. The decoupling device according to claim 2, wherein securing element (19) has a radial projection (35) extending partially or entirely around it and wherein the securing element (19) has at least one recess (45) in its radial projection (35) in the vicinity of the decoupling elements (14, 15).

9. The decoupling device according to claim 2, wherein in the decoupling housing (6, 7, 8) or in the function housing (13), the support shoulders (24, 25, 26) are constituted by means of at least one recess (23) in an outer region of the decoupling housing (6, 7, 8) or function housing (13).

10. The decoupling device according to claim 9, wherein said decoupling elements (14, 15) each have a smooth curved outer surface, and wherein said decoupling housing (6, 7, 8) or the function housing (13) and the securing element (19) have axial and radial support shoulders (24.1, 24.2), and at least the axial support shoulders (24.1) are embodied as arc-shaped, and wherein the curvature of the arc-shaped support shoulders (24, 25, 26) at most corresponds to the curvature of the decoupling elements (14, 15).

11. The decoupling device according to claim 2, further comprising at least one column (41) in which the support shoulders (24, 25, 26) are constituted by a recess (23) on an end face of the column (41).

12. The decoupling device according to claim 11, wherein said decoupling elements (14, 15) each have a smooth curved surface, and wherein said decoupling housing (6, 7, 8) or the function housing (13) and the securing element (19) have axial and radial support shoulders (24.1, 24.2), and at least the axial support shoulders (24.1) are embodied as arc-shaped, and wherein the curvature of the arc-shaped support shoulders (24, 25, 26) at most corresponds to the curvature of the decoupling elements (14, 15).

13. The decoupling device according to claim 1, further comprising two support shoulders (24, 25, 26) for a decoupling element (14, 15), the support shoulders being constituted by the securing element (19).

14. The decoupling device according to claim 13, wherein the sets of decoupling elements (14, 15), each comprise a pair of decoupling elements.

15. The decoupling device according to claim 13, wherein said securing element (19) has a radial projection (35) extending partially or entirely around it and wherein the securing element (19) has at least one slot (36) in its radial projection (35) in the vicinity of the decoupling elements (14, 15).

16. The decoupling device according to claim 13, wherein the securing element (19) has a radial projection (35) extending partially or entirely around it and wherein the securing element (19) has at least one recess (45) in its radial projection (35) in the vicinity of the decoupling elements (14, 15).

17. The decoupling device according to claim 1, wherein said decoupling elements (14, 15) of each set are disposed above one another on a line (18) extending parallel to the longitudinal axis (3).

18. In a decoupling device (1) for an electric motor (2) with a one-part or multiple part decoupling housing (6, 7, 8), which is connected to a function housing (13) and at least partially encompasses the actuator (2), and with decoupling elements (14, 15) comprised of an elastic material, wherein each decoupling element (14, 15) rests against support shoulders (24, 25, 26), the improvement comprising a securing element (19) disposed to extend between and engage at least two sets of decoupling elements each consisting of a plurality of decoupling elements (14, 15), said actuator (2) engaging said securing element (19).

19. In a decoupling device (1) for an actuator (2) with a one-part or multiple part decoupling housing (6, 7, 8), which is connected to a function housing (13) and at least partially encompasses the actuator (2), and with decoupling elements (14, 15) comprised of an elastic material, wherein each decoupling element (14, 15) rests against support shoulders (24, 25, 26), the improvement comprising a securing element (19) disposed to extend between and engage at least two sets of decoupling elements (14, 15), said actuator (2) engaging said securing element (19), said decoupling device (1) having a longitudinal axis (3), the support shoulder (24, 25, 26) for the decoupling elements (14, 15) being embodied in relation to one another so that a rotational axis (27) of the decoupling elements (14, 15) extends obliquely to the longitudinal axis (3).

20. The decoupling device according to claim 19, wherein said decoupling elements (14, 15) are embodied as rolling bodies.

21. The decoupling device according to claim 20, wherein said rolling bodies are embodied in the form of balls.

22. The decoupling device according to claim 19, where one set of decoupling elements (14) is disposed in a first plane extending perpendicular to the longitudinal axis (3) and the other set of decoupling elements (15) is disposed in a plane extending parallel to and spaced from the first plane.

23. The decoupling device according to claim 19, wherein said decoupling elements (14, 15) adjoining one another in the circumference direction enclose a uniform angle α in relation to one another.

* * * * *